(12) United States Patent
Badri et al.

(10) Patent No.: US 10,352,115 B2
(45) Date of Patent: Jul. 16, 2019

(54) PREVENTING FLUID LOSS

(71) Applicant: SCHLUMBERGER TECHNOLOGY CORPORATION, Sugar Land, TX (US)

(72) Inventors: Mohammed Badri, Al-Khobar (SA); Reza Taherian, Al-Khobar (SA)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 598 days.

(21) Appl. No.: 14/340,767

(22) Filed: Jul. 25, 2014

(65) Prior Publication Data

US 2016/0024863 A1   Jan. 28, 2016

(51) Int. Cl.
| | |
|---|---|
| *E21B 33/138* | (2006.01) |
| *E21B 21/00* | (2006.01) |
| *E21B 21/10* | (2006.01) |
| *C09K 8/516* | (2006.01) |
| *E21B 34/00* | (2006.01) |

(52) U.S. Cl.
CPC ............ *E21B 21/003* (2013.01); *C09K 8/516* (2013.01); *E21B 21/103* (2013.01); *E21B 33/138* (2013.01); *C09K 2208/18* (2013.01); *E21B 2034/007* (2013.01)

(58) Field of Classification Search
CPC ..... E21B 21/003; E21B 33/138; E21B 21/103
See application file for complete search history.

(56) References Cited

U.S. PATENT DOCUMENTS

| | | | | |
|---|---|---|---|---|
| 2,128,352 A | * | 8/1938 | Creighton | ............. E21B 21/103 166/318 |
| 2,248,305 A | * | 7/1941 | Rasmussen | ............. E21B 34/14 137/613 |

(Continued)

FOREIGN PATENT DOCUMENTS

EP      2469020 A1    6/2012

OTHER PUBLICATIONS

Savari, et al., "Engineered LCM Design Yields Novel Activating Material for Potential Application in Severe Lost Circulation Scenarios", SPE-164748-MS, Society of Petroleum Engineers, North Africa Technical Conference and Exhibition, Cairo, Egypt, Apr. 15-17, 2013, 10 pages.

(Continued)

*Primary Examiner* — D. Andrews

(57) ABSTRACT

Sealing particles are used to stop or reduce undesired fluid loss. The sealing particles may be swellable or have effective cross-sectional areas greater than five square millimeters or are both swellable and have effective cross-sectional areas greater than five square millimeters. The sealing particles are disposed in one or more locations in which there is undesired fluid flow and, once lodged therein, stop or at least reduce the undesired fluid loss. A tubular having a bypass flow path may be used to deploy the sealing particles. The bypass flow path may use a biased or unbiased sleeve that is selectably movable to expose or block exit ports in the tubular. A retrievable sealing disk may be deployed to move the sleeve. The sealing particles may be made of a bi-stable material with extenders and may be actuated using swellable material. The sealing particles may extend in multiple dimensions.

7 Claims, 10 Drawing Sheets

(56) References Cited

U.S. PATENT DOCUMENTS

| | | | |
|---|---|---|---|
| 3,417,821 A * | 12/1968 | Tinsley | C09K 8/80 |
| | | | 166/283 |
| 8,307,916 B1 | 11/2012 | Wald | |
| 9,284,798 B2 * | 3/2016 | Jamison | E21B 21/003 |
| 2008/0017374 A1 | 1/2008 | Surjaatmadja | |
| 2009/0056934 A1 | 3/2009 | Xu | |
| 2011/0048720 A1 | 3/2011 | Diaz et al. | |

OTHER PUBLICATIONS

International Search Report issued in related PCT application PCT/US2015/041278 dated Sep. 24, 2015, 3 pages.

\* cited by examiner

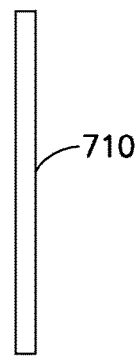
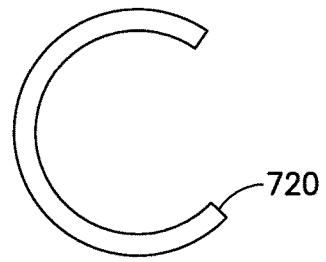
FIG.7a   FIG.7b
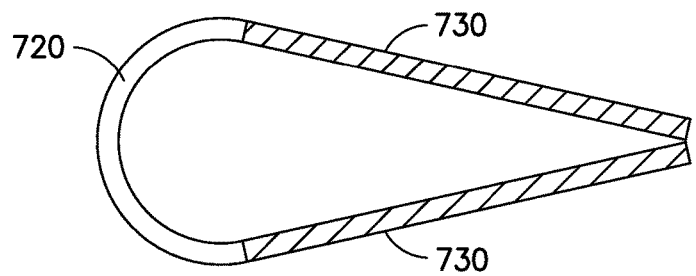
FIG.7c
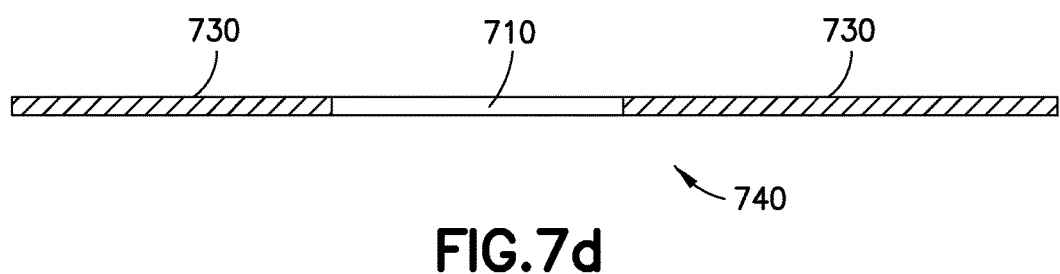
FIG.7d

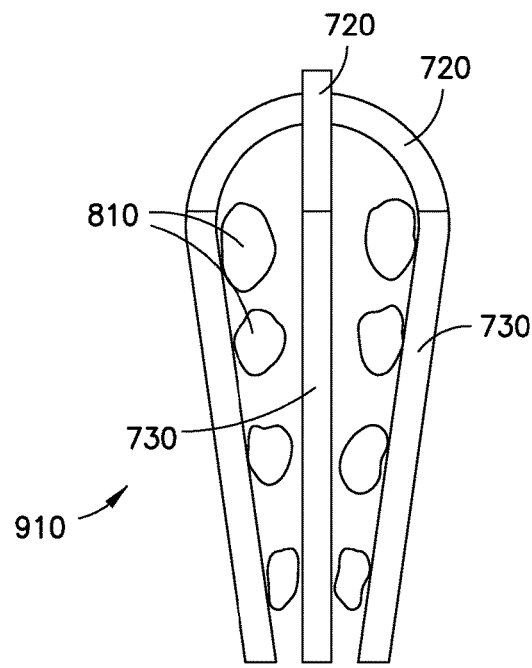
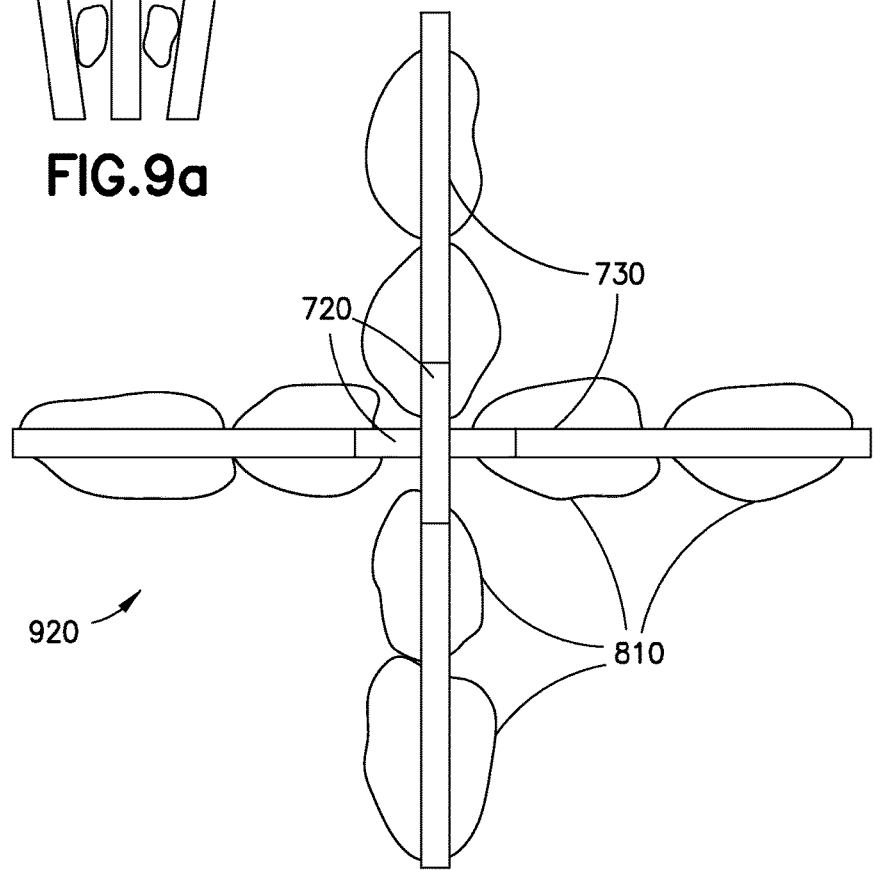

PREVENTING FLUID LOSS

BACKGROUND

When a formation is drilled under normal conditions, the well is almost always filled with drilling fluid that serves to carry rock cuttings to the surface, lubricate the drill bit, and provide an overpressure in the borehole to prevent the flow of formation fluids into the wellbore (i.e., a blow out). The overpressure provided by the drilling fluid also plays a key role in stabilizing the formation. As a result of the overpressure, the liquid part of the drilling fluid enters the formation (filtering) while the solid part accumulates at the formation surface (borehole wall). The accumulated solid contains materials (such as bentonite, for example) that act to form a hydraulic seal. The sealing layer is called "mudcake" and, once formed, prevents any further filtering of the drilling fluid into the formation. Thus, although a relatively small volume of the drilling fluid filters into the formation, the process is normally self-limiting.

Mudcake is able to form and sealing occurs because the pore size in the subsurface formation is smaller than the particle sizes in the drilling fluid. As a result, the bulk of those particles cannot pass through the pore entrance (though a small portion of very fine particles can pass and produce what is known as "fine invasion"). The bulk of the solid drilling fluid material is pressed against and sticks to the pore entrance and gradually builds the impermeable layer of mudcake. However, this process fails to occur when the size of the pore entrance is larger than the solid particles in the mud (drilling fluid). One common example is when fractures are encountered. Some natural fractures have apertures larger than the particles in the mud. This results in a fluid loss problem wherein a large volume of drilling fluid is lost into the formation, with its consequential economic and safety issues.

Fluid loss in fractures is manageable and remedial actions exist. One such remedy is to use solid materials in the drilling fluid that are proportionally larger. With this approach pore sizes of up to 2.5 millimeters have been sealed. More recently, the use of water swellable materials has been proposed. In this case, smaller, water swellable materials are used in the formulation of the mud. These materials enter the fracture, absorb water, and increase their volume, thereby forming a seal. Certain water swellable materials are capable of increasing their weight by over ten-fold in the course of a few hours. The rate and extent of swelling depends on the type of water available. The best results are obtained with fresh water.

A "super k layer", also known as a "cavernous formation", is a source of huge permeability and, when encountered during drilling, can take in large volumes of drilling fluid, even to the point there is not enough drilling fluid left in the borehole to reach the surface. This is referred to as "circulation loss". Because super k layers have very large pores (on the order of tens of centimeter), there is no possibility of forming a mudcake at the borehole wall. As a result, the fluid loss can continue indefinitely so long as the fluid pressure in the borehole is higher than the fluid pressure in the formation.

SUMMARY

Sealing particles are used to stop or reduce undesired fluid loss. The sealing particles may be swellable or have effective cross-sectional areas greater than five square millimeters or are both swellable and have effective cross-sectional areas greater than five square millimeters. The sealing particles are disposed in one or more locations in which there is undesired fluid flow and, once lodged therein, stop or at least reduce the undesired fluid loss. A tubular having a bypass flow path may be used to deploy the sealing particles. The bypass flow path may use a biased or unbiased sleeve that is selectably movable to expose or block exit ports in the tubular. A retrievable sealing disk may be deployed to move the sleeve. The sealing particles may be made of a bi-stable material with extenders and may be actuated using swellable material. The sealing particles may extend in multiple dimensions.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion. Embodiments of determining are described with reference to the following figures. The same numbers are generally used throughout the figures to reference like features and components.

FIG. 7a is a schematic drawing showing a short length of a bi-stable material in its straight form, in accordance with the present disclosure.

FIG. 7b is a schematic drawing showing the short length of bi-stable material in FIG. 7a in its curved shape, in accordance with the present disclosure.

FIG. 7c is a schematic drawing showing the short length of bi-stable material in FIG. 7b with other material added to the ends of the bi-stable material, in accordance with the present disclosure.

FIG. 7d is a schematic drawing showing the short length of bi-stable material and other additional material in FIG. 7c in its open or extended configuration, in accordance with the present disclosure.

FIG. 9a is a schematic drawing showing an embedding object having at least two-dimensions in its closed configuration, in accordance with the present disclosure.

FIG. 9b is a schematic drawing showing the embedding object of FIG. 9a in its open configuration, in accordance with the present disclosure.

DETAILED DESCRIPTION

Figure 1:
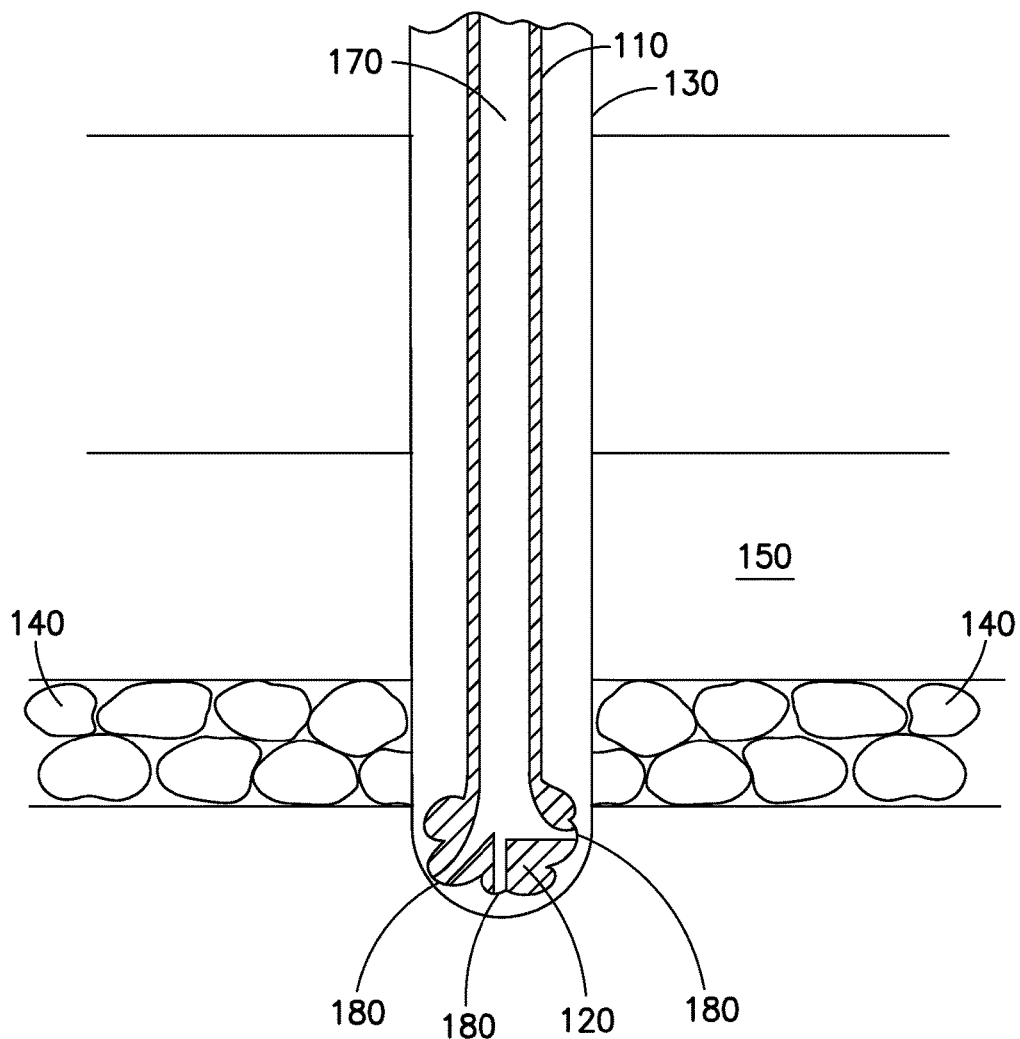
FIG. 1 is a schematic drawing showing a drilling operation in which a super k layer is encountered.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

Some embodiments will now be described with reference to the figures. Like elements in the various figures may be referenced with like numbers for consistency. In the following description, numerous details are set forth to provide an understanding of various embodiments and/or features. However, it will be understood by those skilled in the art that some embodiments may be practiced without many of these details and that numerous variations or modifications from the described embodiments are possible. As used here, the terms "above" and "below", "up" and "down", "upper" and "lower", "upwardly" and "downwardly", and other like terms indicating relative positions above or below a given point or element are used in this description to more clearly describe certain embodiments. However, when applied to equipment and methods for use in wells that are deviated or horizontal, such terms may refer to a left to right, right to left, or diagonal relationship, as appropriate. It will also be understood that, although the terms first, second, etc. may be used herein to describe various elements, these elements should not be limited by these terms. These terms are only used to distinguish one element from another.

The terminology used in the description herein is for the purpose of describing particular embodiments only and is not intended to be limiting. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

A system and method to prevent fluid loss from a pressurized region are described herein. A water swellable material may be used to seal a source of fluid loss such as a super k layer in a subsurface formation while drilling. The system and method may also apply to leaky tubing (i.e., tubulars) such as a pipe in which a leak has developed. As stated above, super k layers may have pore sizes on the order of tens of centimeters, which is very large. For such large pore sizes, the use of normal size water swellable materials becomes ineffective. However, larger particles (made from water swellable materials or not) may be constructed that are well-suited for sealing super k layers. Those larger particles can be delivered to the site of super k layers to provide a sealing surface.

FIG. 1 shows a scenario in which a drilling operation has encountered a super k layer 140. The drill bit 120 has penetrated formation 150 in which layer 140 has large enough pores to qualify as a super k layer. Because of the extremely high permeability of layer 140, the drilling fluid filling well 130 will flow into layer 140 until the pressure in well 130 equals (or drops below) the pressure in layer 140. Since the pores in layer 140 are too large to be blocked by the solids in the conventional mud, no mudcake is formed to counteract this extreme invasion process.

To stop the flow of mud into the super k layer 140, one may introduce materials into the drilling fluid that are on the order of or bigger than the pore sizes in the super k layer. During the normal operation of drilling, the drilling fluid containing the (typically-sized) solid particles are pumped through the central passageway 170 of the drill pipe 110. The drilling fluid travels to the drill bit 120 in which special orifices (jets) 180 are cut, allowing the mud to leave passageway 170 and enter the annular region between the inner diameter of the wellbore 130 and the outer diameter of drill pipe 110. For a six inch drill pipe, for example, the passageway 170 is about four inches in diameter, while the orifices 180 in the drill bit are generally less than one centimeter. The jets 180 are intentionally made small to create a jetting action. As a result, although larger particles could be introduced in the formulation of the mud and carried through central passageway 170 in drill pipe 110, the orifices 180 in the drill bit 120 would prevent them from entering the annulus and coming into contact with the formation wall 130. Currently there is no apparatus available that can deliver such large particles (i.e., greater than approximately one cm) to the bottom of the well. Thus, using existing technology, the largest particle sizes that can be delivered to the super k layer are limited by orifices 180 in drill bit 120 rather than the large central passageway 170 in drill pipe 110.

To circumvent this limitation, one may choose from at least two possible courses of action. One is to use larger particles, but avoid sending those particles through the jetting holes (orifices) 180. Another is to send smaller particles that can grow and become large on site, after they pass through orifices 180. A possible third course of action may involve some combination of the first two.

Figure 2:
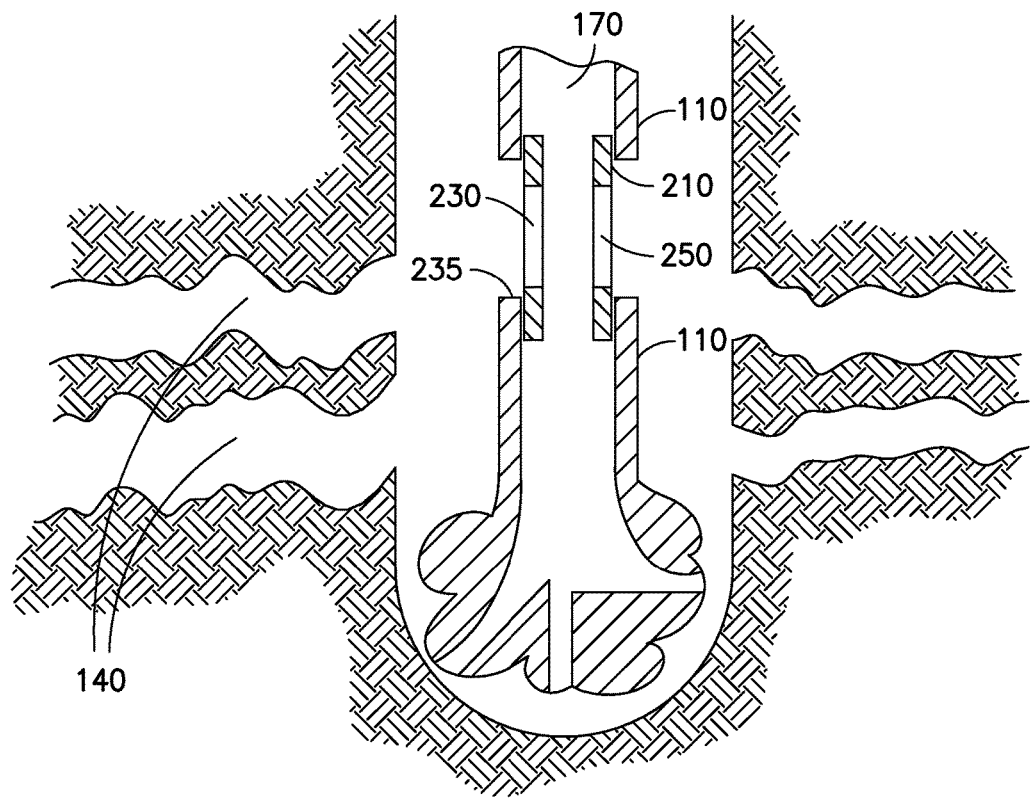
FIG. 2 is a schematic drawing showing a bottom hole assembly (BHA) having a bypass section or bypass opening, in accordance with the present disclosure.

FIG. 2 shows a bottom hole assembly (BHA) similar to that of FIG. 1, but to which a bypass section or bypass opening 230 has been added. Bypass section 230 may employ many different mechanical designs that are conventionally used to stop or start a flow. Bypass section 230 has one or more holes 235 in the wall of drill pipe 110 that are large enough to allow desired large particles to pass into the annular region, thus bypassing jets 180 in drill bit 120. In the embodiment of FIG. 2, two holes 235 are shown that are diametrically opposed. The holes 235 open and close by rotating a cylindrical sleeve 210 that has matching holes 250, but in which the remaining part of its cylindrical structure is solid. Under normal drilling operations, holes 235 are blocked by sleeve 210, rotated to have its solid body facing holes 235. When a super k layer or any layer with large pore or aperture size is encountered, the drilling process is stopped, the rotatable sleeve 210 is rotated (using, for example, a motor (not shown)) so that its holes 250 align with holes 235 in drill pipe 110. This provides a new (temporary) flow path that offers much less resistance to flow, especially for large particles. The drilling fluid thus passes through the flow path formed by aligned holes 235 and 250 and enters the annulus. Under these conditions the drilling fluid may contain sealing particles that are only slightly smaller than the diameter of holes 250 or 235, whichever is smaller. Those larger particles then serve to block the large pores in super k layer 140 and build a mudcake. Once a mudcake forms and the super k layer is sealed, the fluid loss is controlled and sleeve 210 may be rotated back to the closed position. That allows the mud to once again pass through the drill bit and, at this point, normal drilling operations can proceed.

Figure 3A:
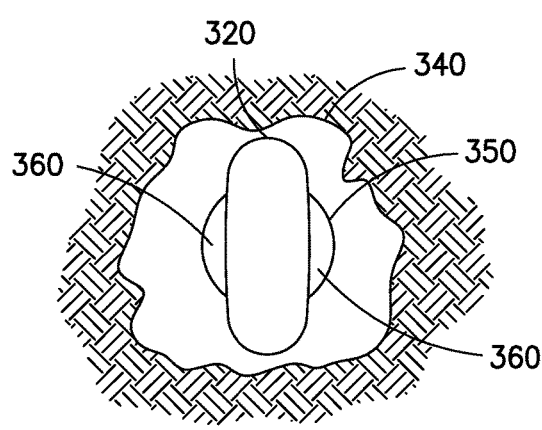
FIG. 3a is a schematic drawing, in end view, of a particle in a pore space, in accordance with the present disclosure.
Figure 3B:
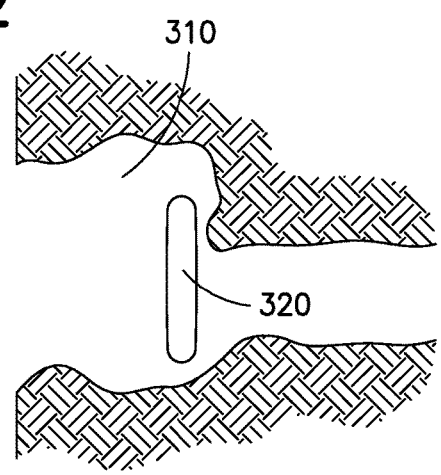
FIG. 3b is a schematic drawing, in cross-sectional view, of the particle in the pore space shown in FIG. 3a, in accordance with the present disclosure.

FIGS. 3a and 3b show an example pore in the super k layer 140 that has been invaded by a particle that is sufficiently large that it can not move past a certain length into the super k layer 140. The large particles may be constituents of a special drilling fluid that contains particles with sizes ranging from the size of particles found in normal drilling fluid up to the maximum size that the downhole equipment (such as one having a bypass section 230) can handle. A pore 310 has an aperture 340. If the size of the large particle 320 is larger than aperture 340, large particle 320 will at least partially block the aperture 340, thereby reducing the effective aperture size, but not necessarily sealing the aperture, as smaller openings may still exist between aperture 340 and the blocking large particle 320. That is, large particle 320 serves to at least reduce the flow into the super k layer dramatically, but may not stop it completely. However, with large particle 320 at least partially blocking aperture 340, other, smaller particles in the mud can fill the resulting smaller effective aperture and particles can act in concert to form a seal and stop the undesired flow.

In some cases the size of aperture 340 near the wellbore may be larger than particle 320, but a pore's size is generally not uniform and can reduce as one moves farther into the pore space, away from the borehole. A reduced pore size 350, some distance into the formation, is conceptually illustrated in FIGS. 3a and 3b. Particle 320 may be small enough to initially pass through aperture 340, but as the rush of the mud invasion into the super k layer 140 continues, particle 320 will be carried deeper into the super k layer 140, where it eventually encounters a reduced aperture (pore throat) 350. If the reduced aperture 350 is smaller than the size of particle 320, particle 320 cannot pass beyond that point. While the entrapped particle 320 effectively further reduces the size of reduced aperture 350, there may still be gaps 360 around particle 320 that remain unobstructed to fluid flow, similar to that described above. However, since the drilling fluid contains a distribution of particles having sizes ranging from small to large, the smaller particles can, as above, enter and seal off gaps 360. Thus, when the large particle 320 is introduced to the super k layer 140 and gets stuck either at the pore face or in the pore throat at some point slightly removed from the borehole wall, it reduces the effective pore size and restricts the flow so that the remainder of the particles in the drilling fluid can seal the flow path, thereby stopping the invasion. In the example of FIGS. 3a and 3b, one large particle 320 is shown, but in practice there will be more. The combined effect of all will be more effective in sealing the super k layer 140 than the single particle shown.

Figure 4A:
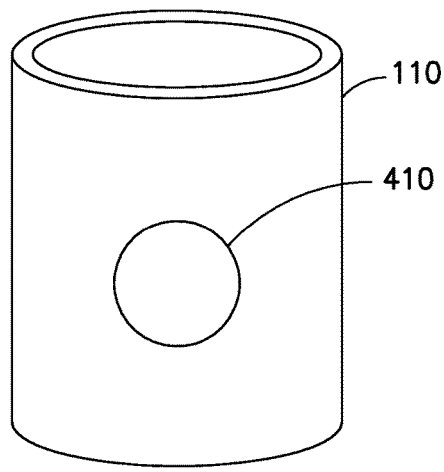
FIG. 4a is a schematic drawing, in side view, of a drill collar (or pipe) with exit ports, in accordance with the present disclosure.
Figure 4B:
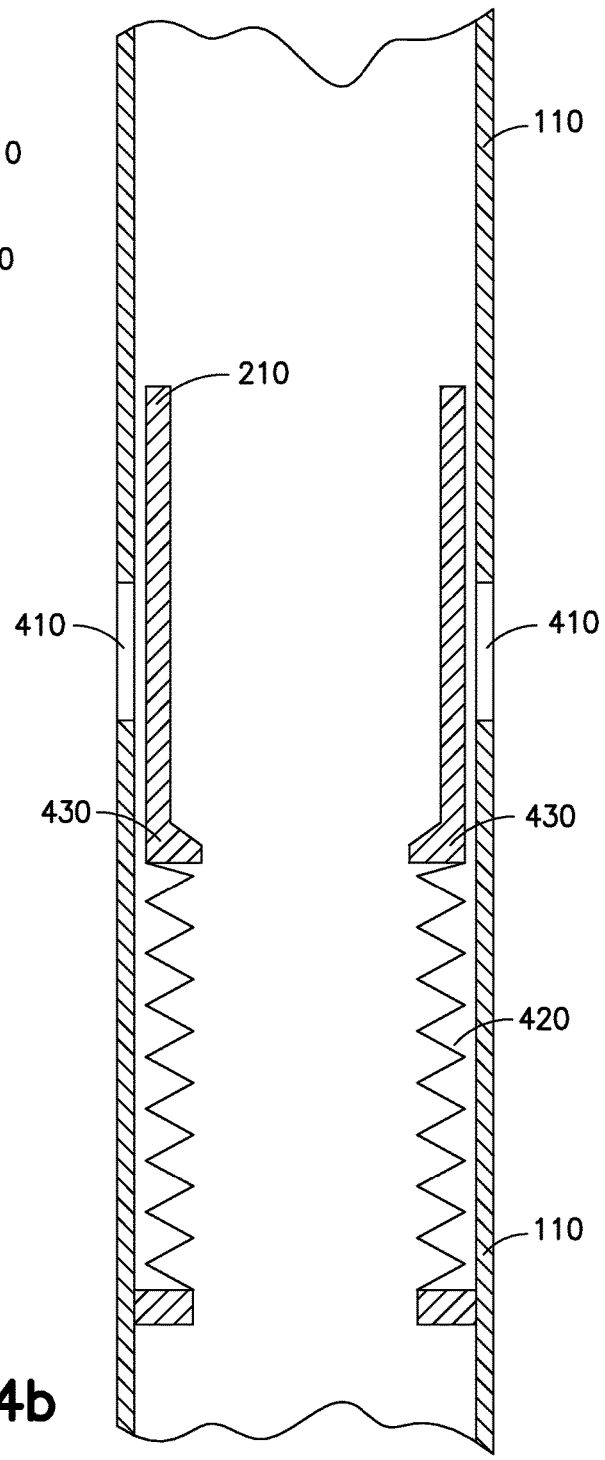
FIG. 4b is a schematic drawing, in cross-sectional view, of the drill collar shown in FIG. 4a and a sleeve disposed therein, in accordance with the present disclosure.

In the embodiment just discussed, one delivers the large particles 320 to the super k layer 140 via the bypass section 230. FIGS. 4a and 4b show an alternative embodiment of a bypass section 230. Drill collar (or pipe) 110 in FIG. 4a is provided with exit ports 410 to allow large particles 320 to pass through the drill collar 110 and enter the annulus. In FIG. 4a one exit port 410 is shown, but, in general, more exit ports are possible and they can be located at various locations along the length of drill pipe 110. The size and shape of exit ports 410 are selected to be larger than the largest particle 320 that is expected to be delivered to the formation. FIG. 4b shows a cross-section of a drill collar 110 having two exit ports 410. During normal drilling operation, those exit ports 410 are closed so that mud can pass down to and through the drill bit (as shown in FIG. 1). A sleeve 210 having no holes is provided that, during normal operations, forms a barrier to prevent the drilling fluid from exiting through exit ports 410. Sleeve 210 is supported by a spring 420 that, during normal drilling operations, is maintained in a compressed, neutral, or elongated state that keeps exit ports 410 closed. When a super k layer 140 is encountered, sleeve 210 may be forced in a direction that compresses or elongates spring 420. As a result, sleeve 210 moves past exit ports 410, allowing the pumped fluid to enter the annulus. Once the pumping-to-seal operation is completed, sleeve 210 is returned to its normal operational position by the spring 420, as shown in FIG. 4b, whereupon normal drilling operations may resume.

Figure 5:
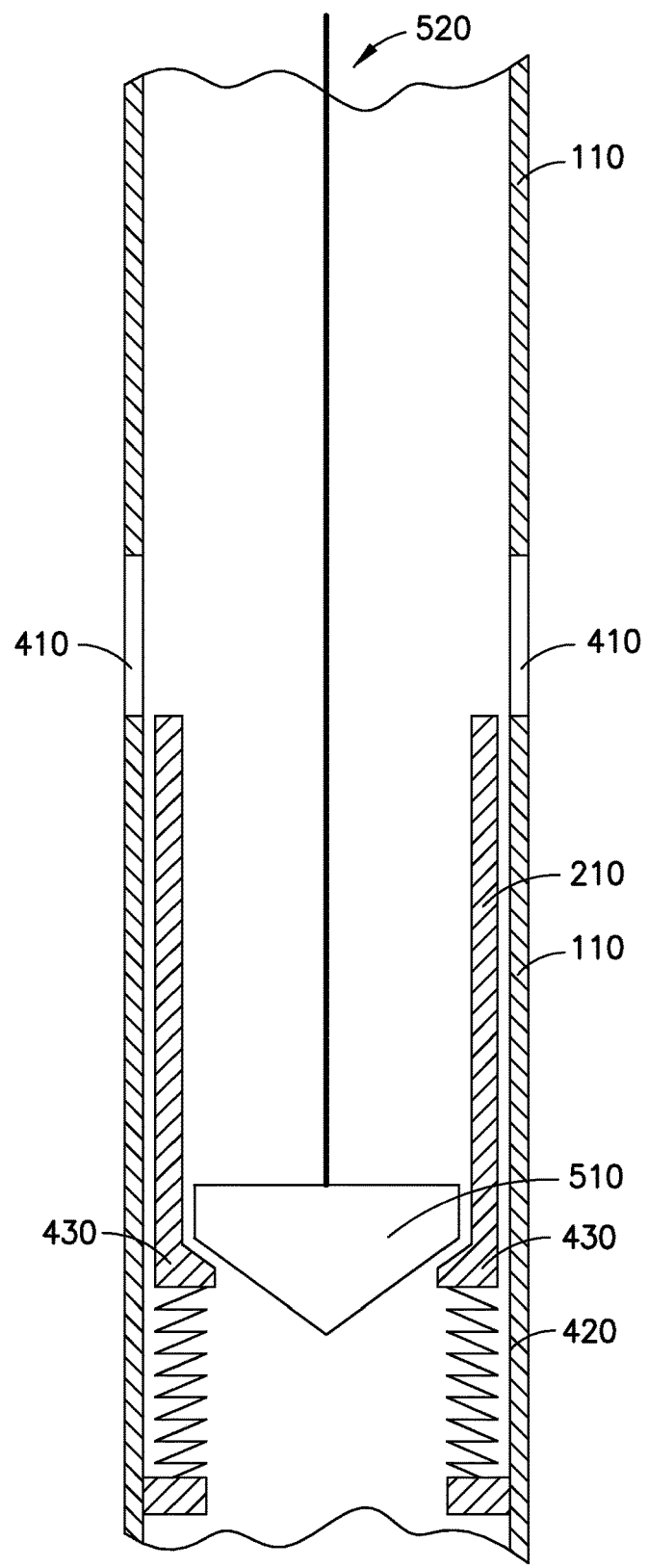
FIG. 5 is a schematic drawing, in cross-sectional view, showing a sealing disk disposed in the sleeve of FIG. 4b, in accordance with the present disclosure.

One possible mechanism for displacing sleeve 210 is shown in FIG. 5. In this embodiment, a sealing disk 510 is sent down from the surface. Disk 510 is attached to a cable 520, enabling its retrieval once the pumping-to-seal operation is terminated. In operation, once a super k layer 140 is encountered, a rapid fluid loss reduces the fluid level in the well or at least reduces the fluid pressure. Once those symptoms are observed, disk 510 and cable 520 may be deployed through central passageway 170 of drill pipe 110. Disk 510 has a diameter that is slightly smaller than the inner diameter of drill pipe 110 or sleeve 210, according to particular embodiments. As a result, it forms a loose piston, pushing the old drilling fluid located below (i.e., ahead of) it through the drill bit. Behind (i.e., above) disk 510, the fluid containing the large particles 320 is pumped into the well. The pumping pressure acts to push disk 510 down until it reaches bypass section 230. Restriction dogs 430 may be located somewhere along sleeve 210 to reduce the effective diameter of drill pipe 110 or sleeve 210. Restriction dogs 430 provide a surface on which disk 510 can seat and make a seal. The seal causes the pumping pressure to bear on sleeve 210, forcing it downward and compressing (in this embodiment) spring 420. Once sleeve 210 passes by exit ports 410, the drilling fluid takes the less restrictive path into the wellbore and, from there, enters the adjacent super k layer 140.

While this operation is in progress, drilling operations are stopped and the pressure is monitored. As the super k layer becomes more and more sealed by the large particle mud, the pressure in the mud column climbs until it reaches an expected level. At this point, some volume of normal drilling fluid is pumped into the well to flush the heavy particles 320 that did not get deposited in the super k layer out of the well. Cable 520 is then used to pull disk 510 up, breaking the disk 510/restriction dog 430 seal. To facilitate the movement of disk 510 in the uphole direction, drilling fluid may be pumped into the annulus from the surface and withdrawn from central passageway 170 (this is the opposite flow direction from normal pumping operations). That helps prevent any cavitation effect caused by drawing disk 510 upward through the drilling fluid. Note in this embodiment disk 510 forms an effective barrier between the different fluids being pumped, similar to a plug. That is, it separates the "large particle drilling fluid", having a full distribution of particle sizes, from the normal drilling fluid being used before a super k layer was encountered. This allows a metered volume of the large particle drilling fluid to be pumped into the well.

Figure 6:
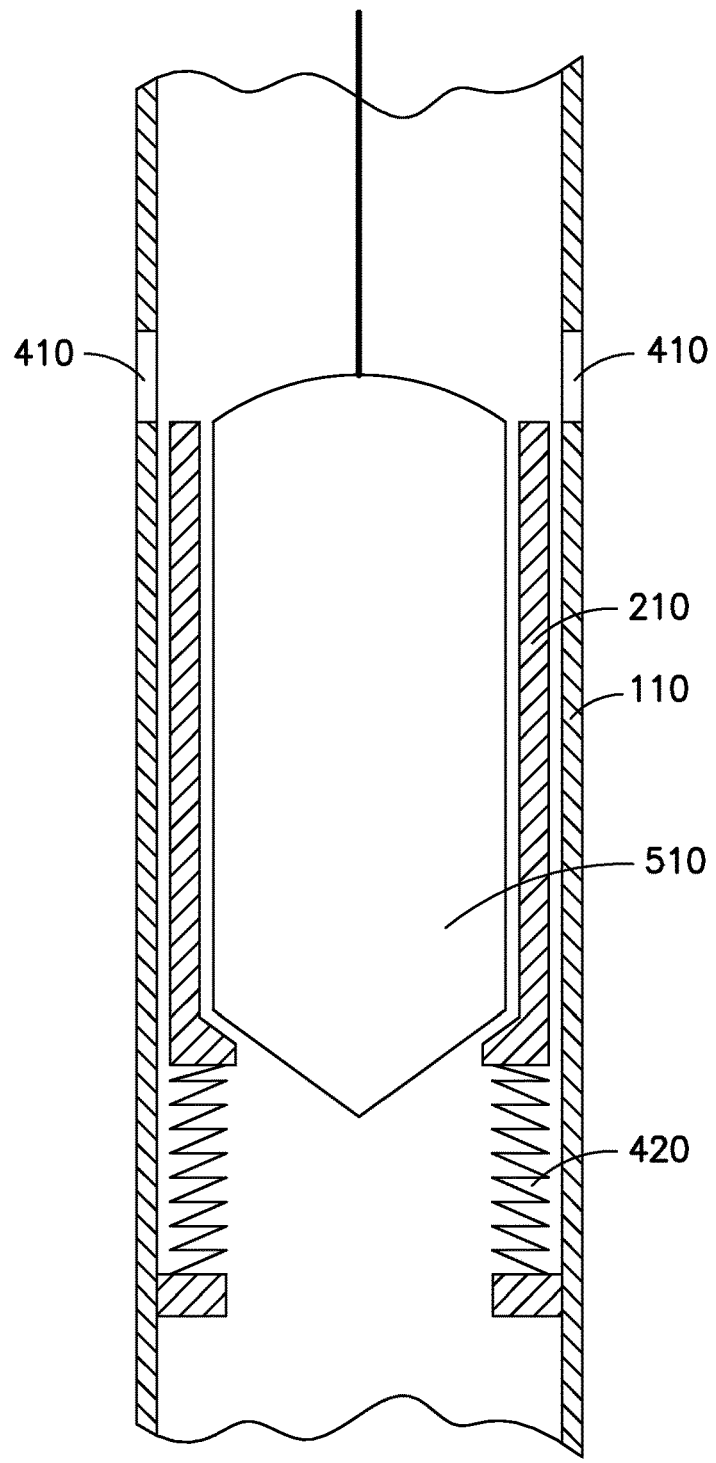
FIG. 6 is a schematic drawing, in cross-sectional view, showing an alternative embodiment of a sealing disk disposed in the sleeve of FIG. 4b, in accordance with the present disclosure.

In an alternative embodiment (shown in FIG. 6), the length of disk 510 is chosen to be large to facilitate the downward motion of sleeve 210. In particular, the length of disk 510 can be as long as sleeve 210. If disk 510 is made of a dense material such as metal and the spring constant is chosen appropriately, disk 510 will weigh enough to compress spring 420 and expose exit ports 410. In this embodiment, pumping pressure is not needed or at least is not the only mechanism available to compress spring 420. Also in this embodiment, the large particle drilling fluid filling the volume above disk 510 can be delivered to the super k layer at pressures that are not excessive since the fluid is not used to compress the spring. That helps reduce further fluid loss.

In another embodiment sleeve 210 is attached to a motor that can be activated to slide the sleeve up or down to open exit ports 410. The motor can be activated using mud pressure coding, for example, as is commonly used in directional drilling. The motor can also be connected to a flow or pressure sensor that senses, for example, the rapid loss of mud or a pressure drop.

In yet another embodiment, smaller particles are pumped into the fluid loss layer, such as a super k layer, but the particles are able to absorb another material, such as water, for example, and expand to increase their size. This is a common practice in fluid loss layers that have fractures with moderate aperture sizes. In this case, in a fashion similar to that shown in FIGS. 3a and 3b, the particles enter the pore space and, upon expanding, form a seal. Water swellable materials have been successfully used for fractures having aperture sizes on the order of one or two millimeters. In super k layers, however, the aperture is on the order of centimeters and the existing practice of using smaller particle swelling material does not work well. The time required for the water swellable particles to enter the fluid loss layer is much shorter than the time it takes them to swell and form an effective seal. For this scenario, it is preferable that the aperture of the fluid loss layer decreases as one moves away from the borehole wall to the point that its size becomes comparable to the size of the particles before swelling. If this is not the case, then the common practice is to allow a certain amount of the particles to enter the fluid loss zone and then shut off the well for a few hours, allowing time for the swellable particles to swell. Sealing apertures of up to 2.5 millimeters in diameter (i.e., pores having effective cross-sectional areas less than five square millimeters) has been accomplished in this manner.

In another embodiment, large water swelling particles are delivered to the super k layer using a by-pass apparatus such as is described above. In practice, a known volume of drilling fluid containing a distribution of larger particles is placed slightly above disk 510, forming a first band of fluid, and delivered to a depth of interest. When ports 410 open, this fluid flows out of the drill pipe and into the super k layer. A second band can be a buffer layer of normal drilling fluid, followed by an activating band, which in most cases will be fresh water. The water swelling particles are known to absorb the fresh water and swell rather quickly. Delivering the fresh water to the super k layer having large swellable particles already in the pore structure expedites the swelling and causes a pressure seal to develop. Note that during this operation, the fluid pressure in the inner diameter of the drill pipe has to be higher than in the annulus to prevent the drilling fluid in the annulus from entering the interior region of the drill pipe. The pressure can be regulated by a combination of drilling fluid density and pumping speed.

Using (water) swellable particles allows the pre-swollen particles to be smaller and pass more freely through small passages than particles that are not swellable and of comparable size to the swollen particles. Smaller water swellable particles (e.g., 1-3 centimeters) can be delivered to the super k layer as described above. Those particles subsequently swell when they come in contact with fresh water and grow four to ten times in length. Thus, the effective particle size is on the order of ten to thirty centimeters. These particles are also more flexible and can form a better seal than conventional, non-swellable particles. The swellable materials not only are able to increase their size, but can also grow to conform to the inner diameter and shape of the pore in which they are disposed.

In yet another embodiment, use is made of bi-stable materials to fill up the pore space and create a hydraulic seal. Bi-stable structures are mechanical objects that are stable in two different shapes or configurations. A common and illustrative example of a bi-stable structure is a "snap" bracelet. That is, a straight piece of bi-stable material is gently struck against a person's wrist and the material "snaps" into its second stable form—an open loop that wraps around the wrist. Bi-stable materials are stable in both configurations, but retain residual stresses that can be used to trigger transitions to their alternate forms. In an embodiment contemplated to seal off freely flowing structures, the bi-stable particles initially resemble closed umbrellas. Those closed-configuration particles are pumped into the high permeability (freely flowing) structure. The particles are then triggered to open up like umbrellas, causing a large restriction in the flow path.

FIG. 7a shows a short length of a bi-stable material 710 in its straight form. When the straight material of FIG. 7a is pressed on its two ends, it is triggered and snaps to a curved shape 720, shown in FIG. 7b. The transition is reversible and if the two ends of the curved shape 720 are pushed open, the material snaps back to the linear shape 710. In the example of FIGS. 7a and 7b, the length of the material is intentionally chosen to be short enough so that the object in FIG. 7b does not form a complete or closed loop. If two pieces of normal material 730 are attached to the two ends of the object in FIG. 7b, the object of FIG. 7c is formed. The object of FIG. 7c has rather large length but small width and behaves similar to the linear "closed umbrella" structure of FIG. 7a. Note that the curvature of curved shape 720 has caused the distal ends of 730 pieces to come close to one another and may even be touching. If these two ends are pulled apart by some force, the curved shape 720 will snap to its straight form 710 and the structure 740 of FIG. 7d is formed. This shape may have, for example, twice as much length as the object of FIG. 7c, and despite its still small width may therefore behave similar to the "open umbrella" referred to above due to its increased length.

Figure 8A:
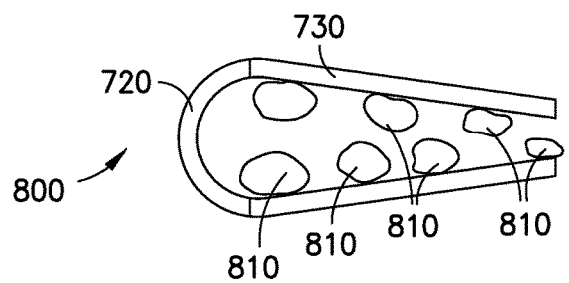
FIG. 8a is a schematic drawing showing the short length of bi-stable material and other additional material in FIG. 7c with swellable material disposed in the interior region, in accordance with the present disclosure.
Figure 8B:
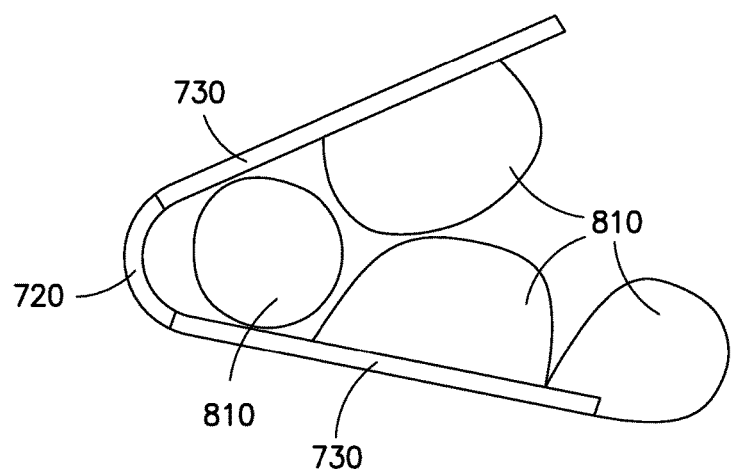
FIG. 8b is a schematic drawing showing the short length of bi-stable material and other additional material with swellable material disposed in its interior region with the swellable material at least partially swelled, in accordance with the present disclosure.

The triggering mechanism for the transition from bent (curved) to straight forms can be provided by (water) swellable materials. FIG. 8a shows a composite structure 800 similar to that of FIG. 7c, with water swellable materials 810 added to the interior region of the structure. Once this object comes into contact with water, the swelling of material 810 causes the two ends of normal material 730 to separate, forming the configuration shown in FIG. 8b. The swelling continues until the two ends of curved shape 720 pass a transition zone and curved shape 720 snaps to the linear shape 710 of FIG. 7a or 7d.

Figure 8C:
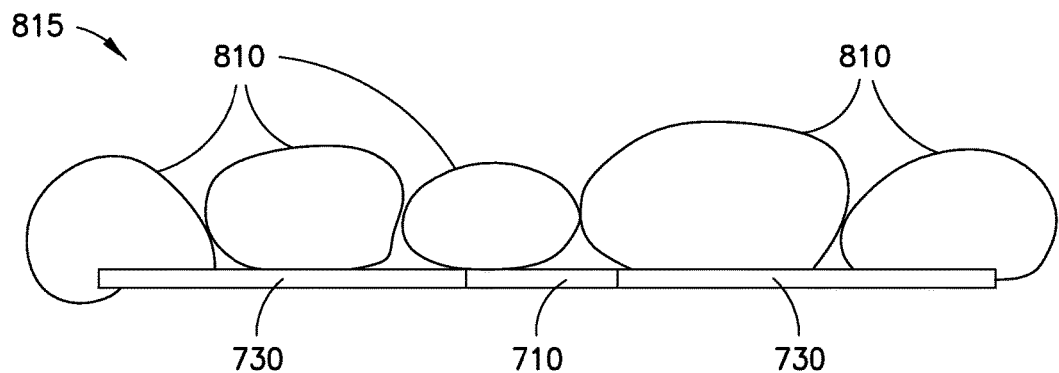
FIG. 8c is a schematic drawing showing the short length of bi-stable material and other additional material with swellable material disposed in its interior region with the swellable material completely swelled and the structure completely open, in accordance with the present disclosure.

Composite structures 800 can be made with small enough width to be pumped through inner passageway 170 of drill pipe 110 and pass through orifices 180 of drill bit 120. Once these composite structures 800 are in the annulus, the rush caused by the invasion into the formation (rapid fluid loss) will convey them into the super k layer, where they will form random conglomerates by compaction. The band (volume) of mud containing composite structures 800 can be followed by a band of fresh water that will be absorbed by the water swellable particles 810, causing them to expand and, in turn, causing curved shape 720 to snap to the increased length linear structure 815 (FIG. 8c). This structure has large length and, depending on its orientation relative to the flow direction, can lodge inside the pore and restrict or even stop the flow.

When the increased length linear structure 815 is aligned with the flow direction, it may be carried by the flow deep into the super k layer. The deeper those particles invade the super k layer, the more fluid is lost. FIGS. 9a and 9b show another embodiment in which the embedding object is not linear and, once snapped open, will lodge in the pore. An example of a closed embedding object 910 is shown in FIG. 9a in which two curved shape structures 720 are attached together to form a cross (when snapped to their linear forms). Four legs made of normal material 730 (three legs are shown in FIG. 9a) are attached to the four ends of the curved shapes 720 (ends of the cross). When the water swellable material 810 expands, it causes closed embedding object 910 to snap into open embedding object 920 (FIG. 9b). The open embedding object 920 has four legs in a cross shape; thus, as soon as it snaps open and encounters a pore space of corresponding dimensions, it lodges in the pore, independent of its orientation relative to the fluid flow direction. This embodiment is not limited to four legs and structures with more than two cured shapes 720 attached together can be made that, when expanded, form a plurality of legs. Since the water swellable material expands in all directions, its unexpanded volume can be chosen such that when it swells, not only does it snap closed embedding object 910 open, but it also fills the entire cross section of open embedding object 920 and forms a very effective seal.

Figure 11A:
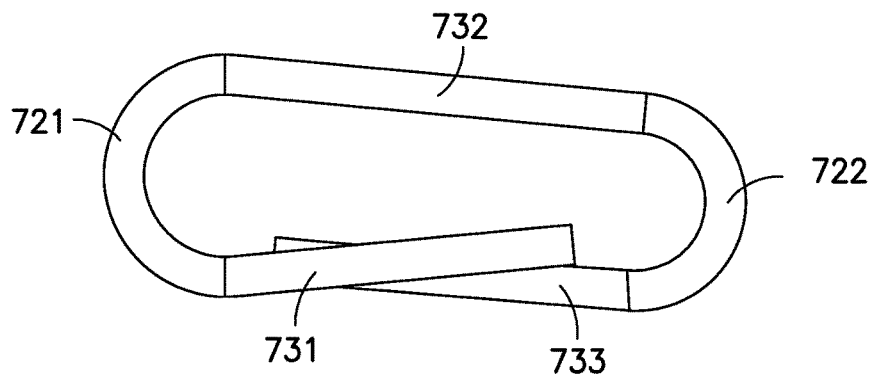
FIG. 11a is a schematic drawing showing two short lengths of bi-stable material in its curved shape joined to a common normal material, in accordance with the present disclosure.
Figure 11B:
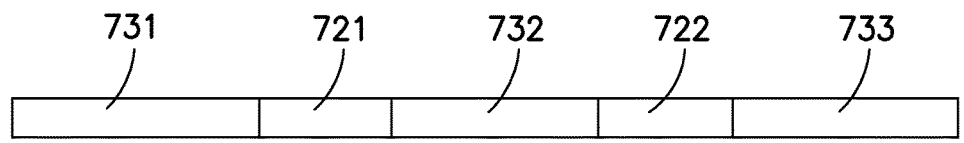
FIG. 11b is a schematic drawing showing the short lengths of bi-stable material in FIG. 11a in their straight form, in accordance with the present disclosure.

In the alternative embodiment shown in FIG. 11a, curved shapes (i.e., bi-stable materials) 721 and 722 share (i.e., each connect to opposite ends of) a common piece of normal material 732. In this case, the other ends of the curved shapes 721, 722 attach to ends of normal material 731, 732, respectively. In this embodiment, the snapping point is not in the middle of the structure as it is for the open embedding object 920. Rather, there are two snapping points offset from the middle of shared piece 732. The curved configuration of FIG. 11a is roughly the same length as that of FIG. 9a, but, once in its snapped configuration (FIG. 11b), it can be as much as one and a half times longer. Although an embodiment having two bi-stable material sections is shown in FIGS. 11a, 11b, other embodiments may have more bi-stable material sections joined to corresponding normal materials.

In the embodiments shown thus far, the straight (i.e., normal) materials are connected in line with the two ends of the curved material. These embodiments lead to straight structures when they are snapped open. In another set of embodiments, exemplified by that shown in FIGS. 12a and 12b, it is possible to connect the pieces 720, 735, 736 at different angles. In that case, the resulting snapped structure will not lie along a straight line. FIG. 12b shows a snapped form in its non-linear configuration.

Figure 12A:
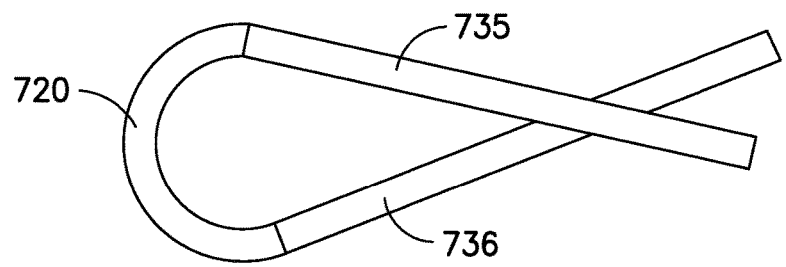
FIG. 12a is a schematic drawing showing a short length of a bi-stable material in its curved shape with normal material joined at different angles, in accordance with the present disclosure.
Figure 12B:
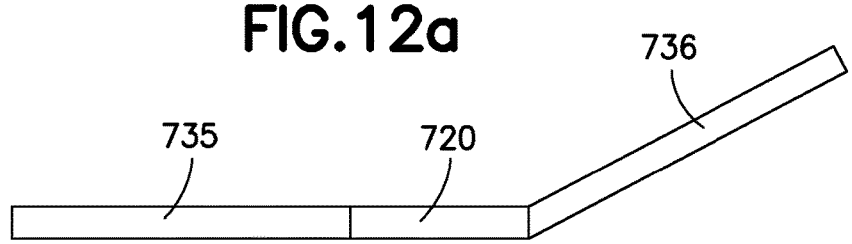
FIG. 12b is a schematic drawing showing the short length of bi-stable material in FIG. 12a in its straight form and the resulting non-linear structure, in accordance with the present disclosure.

It is easy to see if the embodiments of FIGS. 12a and 11a are combined, it is possible to obtain three dimensional snapped forms that can be more effective in sealing large pores. That is, the embodiments shown in FIGS. 11a, 11b, 12a, and 12b may be extended to other dimensions, similar to that shown in FIGS. 9a and 9b, by joining, for example, multiple bi-stable materials together. The added dimensions may be more effective in trapping the structure within the pore space of the rock and facilitate the build up of a plug that can serve to block the fluid loss into the formation. In addition, the joining can be done using a normal material in addition to or instead of a bi-stable material.

Figure 10:
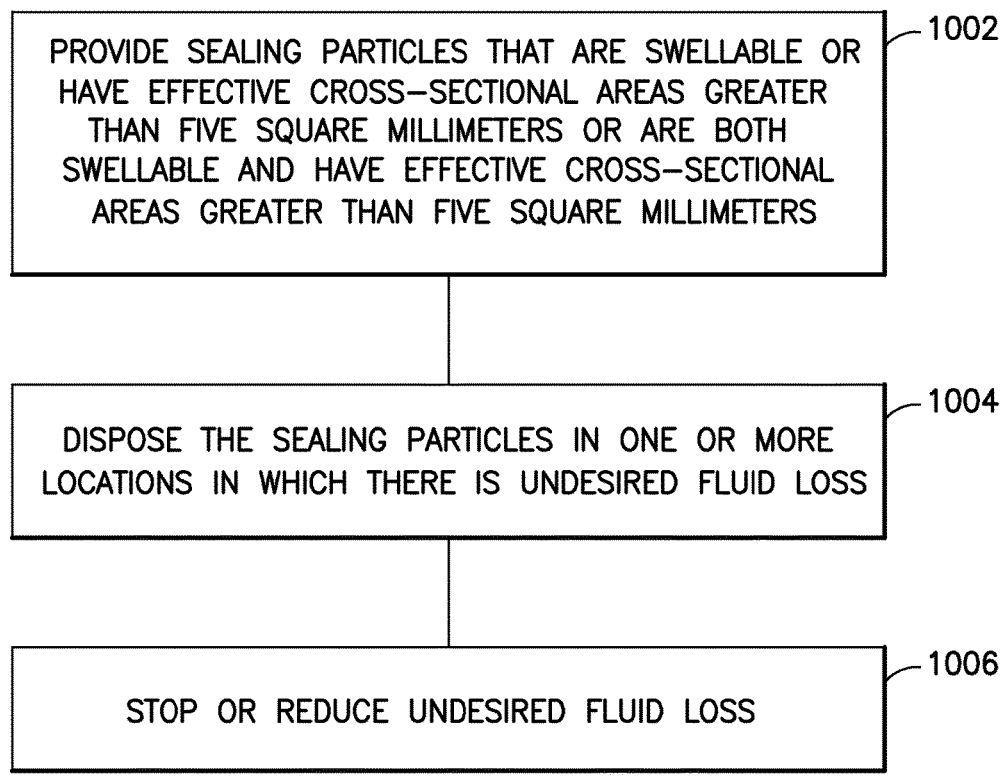
FIG. 10 is a workflow diagram for an embodiment to stop or reduce an undesired fluid flow using sealing particles, in accordance with the present disclosure.

FIG. 10 shows a flowchart or workflow to stop or reduce undesired fluid flow using sealing particles. Sealing particles that are swellable or have effective cross-sectional areas greater than five square millimeters or are both swellable and have effective cross-sectional areas greater than five square millimeters are provided (1002). The sealing particles are disposed in one or more locations in which there is undesired fluid loss (1004) and thereby stop or reduce the undesired fluid loss (1006).

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the scope of the present disclosure, and that they may make various changes, substitutions, and alterations herein without departing from the scope of the present disclosure.

The Abstract at the end of this disclosure is provided to comply with 37 C.F.R. § 1.72(b) to allow the reader to quickly ascertain the nature of the technical disclosure. It is submitted with the understanding that it will not be used to interpret or limit the scope or meaning of the claims.

While only certain embodiments have been set forth, alternatives and modifications will be apparent from the above description to those skilled in the art. These and other alternatives are considered equivalents and within the scope of this disclosure and the appended claims. Although only a few example embodiments have been described in detail above, those skilled in the art will readily appreciate that many modifications are possible in the example embodiments without materially departing from this disclosure. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed is:

1. A system, comprising:
   sealing particles that have effective cross-sectional areas greater than five square millimeters, wherein the sealing particles comprise a composite structure of a bi-stable material connected to an extender material, wherein the composite structure has an open configuration and a closed configuration, wherein a swellable material is contained within an interior region of the composite structure in the closed configuration, and wherein the swellable material is connected to an exterior surface of the composite structure in the open configuration;
   a tubular having a bypass opening in the wall of the tubular large enough to pass the sealing particles; and
   a sleeve moveably mounted on the tubular capable of selectably covering or exposing the bypass opening.

2. The system of claim 1, wherein the sleeve has one or more holes in the wall of the sleeve and can rotate, or the sleeve can translate longitudinally along the tubular.

3. The system of claim 1, further comprising a displacement mechanism.

4. The system of claim 3, wherein the displacement mechanism includes a disk attached to a cable, and wherein the disk can engage the sleeve or one or more restriction dogs projecting from the sleeve.

5. The system of claim 1, further comprising a biasing mechanism attached to the sleeve and to the tubular.

6. The system of claim 5, further comprising a disk attached to a cable, and wherein the disk can engage the sleeve or one or more restriction dogs projecting from the sleeve, and the net buoyancy of the disk is sufficient to overcome the bias of the biasing mechanism.

7. The system of claim 1, further comprising a bottom hole assembly having a drill bit at a distal end thereof, wherein the tubular having the bypass is in the bottom hole assembly above the drill bit.

* * * * *